(12) United States Patent
You et al.

(10) Patent No.: US 11,269,233 B2
(45) Date of Patent: Mar. 8, 2022

(54) ANTI-PEEPING DEVICE, ANTI-PEEPING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yang You, Beijing (CN); Ruizhi Yang, Beijing (CN); Zhaokun Yang, Beijing (CN); Ruiyong Wang, Beijing (CN); Zhenhua Lv, Beijing (CN); Xiang Feng, Beijing (CN); Yun Qiu, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 469 days.

(21) Appl. No.: 15/779,639

(22) PCT Filed: Oct. 26, 2017

(86) PCT No.: PCT/CN2017/107897
§ 371 (c)(1),
(2) Date: May 29, 2018

(87) PCT Pub. No.: WO2018/171191
PCT Pub. Date: Sep. 27, 2018

(65) Prior Publication Data
US 2020/0341343 A1  Oct. 29, 2020

(30) Foreign Application Priority Data
Mar. 22, 2017  (CN) .......................... 201710172987.9

(51) Int. Cl.
*G02F 1/1676* (2019.01)
*G02F 1/16757* (2019.01)
(Continued)

(52) U.S. Cl.
CPC ......... *G02F 1/1676* (2019.01); *G02B 26/005* (2013.01); *G02F 1/167* (2013.01);
(Continued)

(58) Field of Classification Search
CPC ...... G02F 1/167; G02F 1/1676; G02F 1/1677; G02F 1/134309; G02F 1/16761;
(Continued)

(56) References Cited

U.S. PATENT DOCUMENTS

2005/0104844 A1* 5/2005 Nakai .................. G09G 3/3446
 345/107
2009/0002267 A1  1/2009 Nam et al.
(Continued)

FOREIGN PATENT DOCUMENTS

CN  102566060 A  7/2011
CN  102654706 A  9/2012
(Continued)

OTHER PUBLICATIONS

English translation of ISR for PCT/CN2017/107897 dated Jan. 25, 2018.
(Continued)

*Primary Examiner* — Brandi N Thomas
(74) *Attorney, Agent, or Firm* — Arent Fox LLP; Michael Fainberg (57) ABSTRACT

An anti-peeping device, an anti-peeping method thereof and a display device are disclosed. The anti-peeping device comprises: an upper substrate and a lower substrate which are arranged opposite to each other, and an electrophoresis layer filled between the upper substrate and the lower substrate; an electrode layer is arranged on a side, facing the electrophoresis layer, of at least one of the upper substrate and the lower substrate; the electrode layer includes a plurality of first sub-electrodes distributed along a first
(Continued)

direction; and the electrophoresis layer includes charged particles with an electric property opposite to that of the first sub-electrodes to absorb light rays.

15 Claims, 6 Drawing Sheets (51) Int. Cl.
G02B 26/00 (2006.01)
G02F 1/1681 (2019.01)
G02F 1/167 (2019.01)
G02F 1/1675 (2019.01)

(52) U.S. Cl.
CPC ........ G02F 1/1681 (2019.01); G02F 1/16757 (2019.01); *G02F 2001/1678* (2013.01)

(58) Field of Classification Search
CPC ............ G02F 1/1323; G02F 1/133512; G02F 1/16757; G02F 1/16766; G02F 1/1679; G02F 1/1681; G02F 2001/1678; G02F 2203/58; G02F 2203/66; G02F 1/133514; G02F 1/133524; G02F 1/133553; G02F 1/1347; G02F 1/15; G02F 1/16755; G02F 1/1685; G02F 1/172; G02F 2201/124; G02F 2201/44

USPC ........ 359/265–267, 271–273, 290–292, 295, 359/296, 298
See application file for complete search history.

(56) References Cited

U.S. PATENT DOCUMENTS

2012/0038567 A1* 2/2012 Kim ................... G06F 3/045
345/173
2012/0170115 A1 7/2012 Zhang et al.

FOREIGN PATENT DOCUMENTS

| CN | 103246123 | A | 8/2013 |
| CN | 104049371 | A | 9/2014 |
| CN | 104133319 | A | 11/2014 |
| CN | 105954901 | A | 9/2016 |
| CN | 106773444 | A | 5/2017 |
| JP | 2006349903 | A | 12/2006 |

OTHER PUBLICATIONS

English translation of Chinese Office Action for Chinese application No. 201710172987.9 dated Apr. 18, 2018.
Chinese Office Action for Chinese Application No. 201710172987.9 dated Nov. 29, 2018.

* cited by examiner

ANTI-PEEPING DEVICE, ANTI-PEEPING METHOD THEREOF AND DISPLAY DEVICE

CROSS-REFERENCE TO RELATED APPLICATION

This application is a National Stage of International Application No. PCT/CN2017/107897, filed Oct. 26, 2017, which claims priority to Chinese Patent Application No. 201710172987.9, filed Mar. 22, 2017, both of which are hereby incorporated by reference in their entireties.

TECHNICAL FIELD

This disclosure relates to the field of display technologies, and particularly to an anti-peeping device, an anti-peeping method thereof and a display device.

BACKGROUND

A viewing angle is an index of a display, and requirements on the viewing angle are different in different application scenarios. When users are in an open environment with a need of secrecy, for example, when they are inputting withdrawal passwords, or when they are taking a public transport for viewing personal information or for business negotiations, then the display needs to be provided with a narrower viewing angle to protect personal privacy. At this time, an anti-peeping device with a controllable viewing angle becomes a necessity.

SUMMARY

Embodiments of the disclosure provide an anti-peeping device, including: an upper substrate and a lower substrate which are arranged opposite to each other; an electrophoresis layer filled between the upper substrate and the lower substrate; and an electrode layer arranged on a side, facing the electrophoresis layer, of at least one of the upper substrate and the lower substrate; wherein the electrode layer includes a plurality of first sub-electrodes distributed along a first direction; and the electrophoresis layer includes charged particles with an electric property opposite to that of the first sub-electrodes to absorb light rays.

In some embodiments of the disclosure, the electrophoresis layer includes: a transparent dispersion medium and a plurality of colorant particles dispersed in the transparent dispersion medium.

In some embodiments of the disclosure, the colorant particles are black pigment particles or black dye particles.

In some embodiments of the disclosure, the electrophoresis layer includes: a transparent dispersion medium and electronic ink facing the transparent dispersion medium.

In some embodiments of the disclosure, the electronic ink includes a plurality of microcapsules, wherein each of the plurality of microcapsules is internally encapsulated with black charged particles and non-black charged particles, wherein the black charged particles have an electric property opposite to that of the non-black charged particles.

In some embodiments of the disclosure, the electronic ink includes a microcup array, wherein each microcup is internally encapsulated with black charged particles and non-black charged particles, wherein the black charged particles have an electric property opposite to that of the non-black charged particles.

In some embodiments of the disclosure, the electrophoresis layer includes: a transparent dispersion medium and an electron current powder microcup facing the transparent dispersion medium, wherein the electron current powder microcup is internally encapsulated with black charged particles and non-black charged particles, wherein the black charged particles have an electric property opposite to that of the non-black charged particles.

In some embodiments of the disclosure, the upper substrate and the lower substrate are both provided with an electrode layer, and an orthographic projection of first sub-electrodes at one side of the upper substrate onto the lower substrate and an orthographic projection of first sub-electrodes at one side of the lower substrate onto the lower substrate overlap with each other.

In some embodiments of the disclosure, the upper substrate and the lower substrate are both provided with an electrode layer, an orthographic projection of first sub-electrodes at one side of the upper substrate onto the lower substrate and an orthographic projection of first sub-electrodes at one side of the lower substrate onto the lower substrate does not overlap with each other; and the first sub-electrodes at one side of the upper substrate are arranged in a staggered manner with the first sub-electrodes at one side of the lower substrate.

In some embodiments of the disclosure, spacing between two adjacent first sub-electrodes in each electrode layer corresponds to a viewing angle of the anti-peeping device.

In some embodiments of the disclosure, spacing between the upper substrate and the lower substrate corresponds to a viewing angle of the anti-peeping device.

In some embodiments of the disclosure, the electrode layer further includes a plurality of second sub-electrodes distributed along a second direction, and the second sub-electrodes and the first sub-electrodes are formed integrally.

In some embodiments of the disclosure, the upper substrate and the lower substrate are glass substrates or flexible substrates.

Embodiments of the disclosure provide another anti-peeping device, including: an upper substrate and a lower substrate which are arranged opposite to each other; an electro wetting layer filled between the upper substrate and the lower substrate; and an electrode layer arranged on a side, facing the electro wetting layer, of at least one of the upper substrate and the lower substrate; wherein the electrode layer includes a plurality of first sub-electrodes distributed along a first direction; and the electro wetting layer includes liquid drops distributed at an interval on an insulation hydrophobic layer above the first sub-electrodes to absorb light rays.

In some embodiments of the disclosure, in the anti-peeping device with the electro wetting layer, the electrode layer further includes a plurality of second sub-electrodes distributed along a second direction, and the second sub-electrodes and the first sub-electrodes are formed integrally.

In some embodiments of the disclosure, in the anti-peeping device with the electro wetting layer, the upper substrate and the lower substrate are both provided with an electrode layer, and an orthographic projection of first sub-electrodes at one side of the upper substrate onto the lower substrate and an orthographic projection of first sub-electrodes at one side of the lower substrate onto the lower substrate overlap with each other.

In some embodiments of the disclosure, in the anti-peeping device with the electro wetting layer, the upper substrate and the lower substrate are both provided with an electrode layer, and an orthographic projection of first sub-electrodes at one side of the upper substrate onto the lower substrate and an orthographic projection of first sub-electrodes at one side of the lower substrate onto the lower substrate does not overlap with each other, and the first sub-electrodes at one side of the upper substrate are arranged in a staggered manner with the first sub-electrodes at one side of the lower substrate.

In some embodiments of the disclosure, in the anti-peeping device with the electro wetting layer, spacing between two adjacent first sub-electrodes in each electrode layer corresponds to a viewing angle of the anti-peeping device.

In some embodiments of the disclosure, in the anti-peeping device with the electro wetting layer, spacing between the upper substrate and the lower substrate corresponds to a viewing angle of the anti-peeping device.

In some embodiments of the disclosure, in the anti-peeping device with the electro wetting layer, the upper substrate and the lower substrate are glass substrates or flexible substrates.

Embodiments of the disclosure further provide an anti-peeping method of the anti-peeping device with the electrophoresis layer, including: applying a positive voltage to the first sub-electrodes; and charged particles with negative electricity to absorb light rays in the electrophoresis layer are absorbed to positions of the first sub-electrodes.

Embodiments of the disclosure further provide another anti-peeping method of the anti-peeping device with the electrophoresis layer, including: applying a negative voltage to the first sub-electrodes; and charged particles with positive electricity to absorb light rays in the electrophoresis layer are absorbed to positions of the first sub-electrodes.

Embodiments of the disclosure further provide an anti-peeping method of the anti-peeping device with the electro wetting layer, including: applying a voltage to the electrode layer, such that the liquid drops in the electro wetting layer are dispersed to absorb light rays.

Embodiments of the disclosure further provide a display device, including a display panel and an anti-peeping device which are arranged in a stack manner; and the anti-peeping device is the anti-peeping device according to the embodiments of the disclosure above.

DETAILED DESCRIPTION OF THE EMBODIMENTS

Implementations of an anti-peeping device, an anti-peeping method thereof and a display device according to embodiments of the disclosure will be described below clearly and fully with reference to the drawings in the embodiments of the disclosure.

Wherein the thickness and shape of each film layer in the drawings do not reflect the real proportion of the anti-peeping device, and are only intended to illustrate the content of the disclosure.

Figure 1:
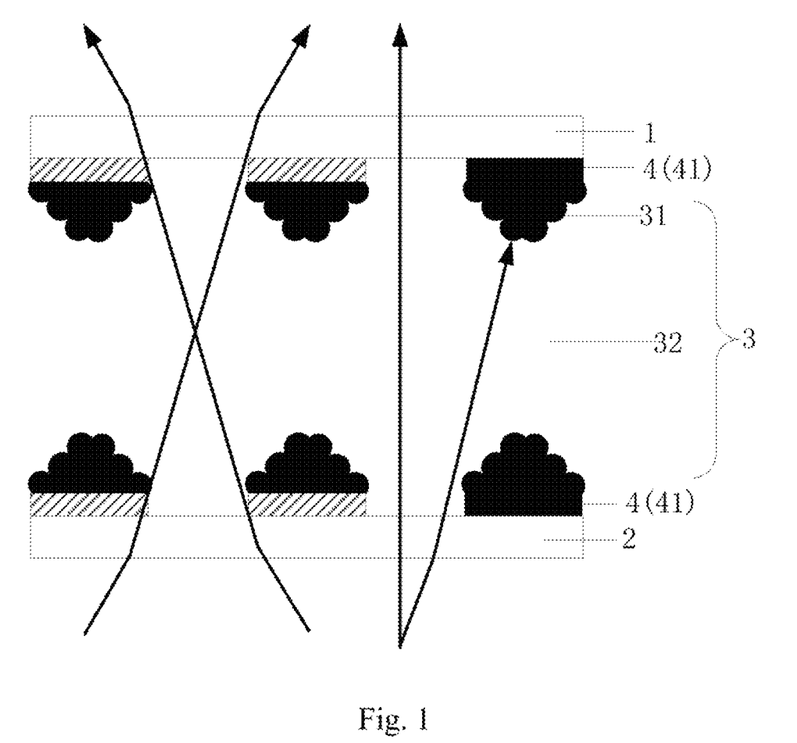
FIG. 1 is a first structural schematic diagram of an anti-peeping device according to embodiments of the disclosure.
Figure 2:
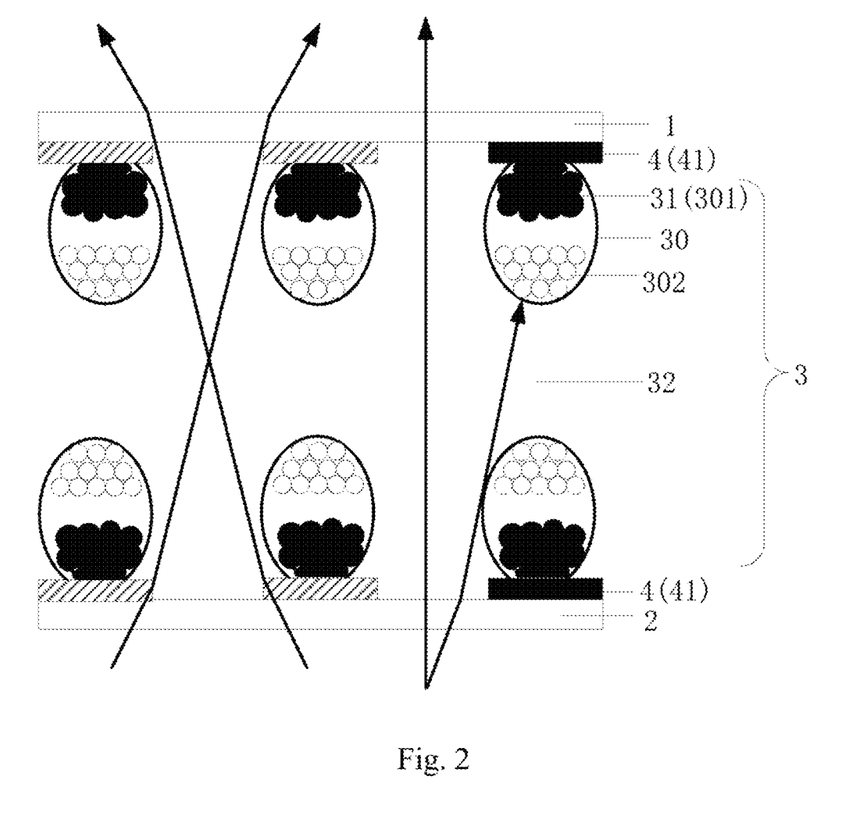
FIG. 2 is a second structural schematic diagram of an anti-peeping device according to the embodiments of the disclosure.
Figure 3:
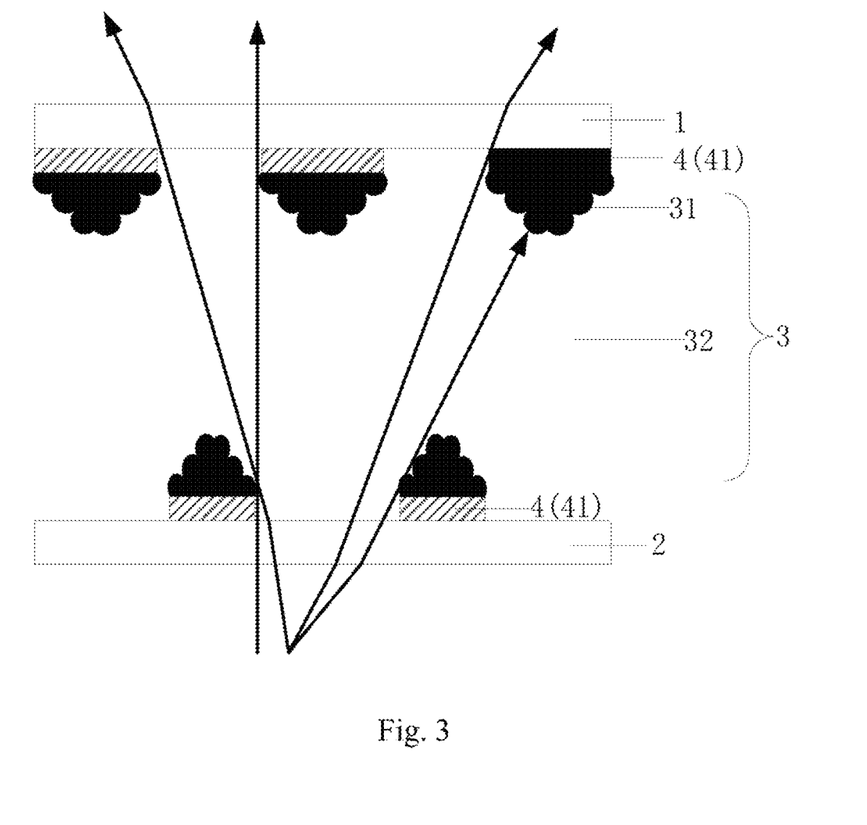
FIG. 3 is a third structural schematic diagram of an anti-peeping device according to the embodiments of the disclosure.

As illustrated in FIG. 1 to FIG. 3, the embodiments of the disclosure provide an anti-peeping device, including an upper substrate 1 and a lower substrate 2 which are arranged opposite to each other, and an electrophoresis layer 3 filled between the upper substrate 1 and the lower substrate 2; wherein an electrode layer 4 is arranged on a side, facing the electrophoresis layer 3, of at least one of the upper substrate 1 and the lower substrate 2; and the electrode layer 4 includes a plurality of first sub-electrodes 41 distributed along a first direction; and the electrophoresis layer 3 includes charged particles 31 with an electric property opposite to that of the first sub-electrodes 41 to absorb light rays.

The anti-peeping device according to the embodiments of the disclosure above is arranged with the upper substrate and the lower substrate which are arranged opposite to each other, and the electrophoresis layer filled between the upper substrate and the lower substrate; the electrode layer is arranged on a side, facing the electrophoresis layer, of at least one of the upper substrate and the lower substrate; the electrode layer includes a plurality of first sub-electrodes distributed along a first direction; and the electrophoresis layer includes charged particles with an electric property opposite to that of the first sub-electrodes to absorb light rays.

In the anti-peeping device according to the embodiments of the disclosure above, since the first sub-electrodes have an electric property opposite to that of the charged particles configured to absorb light rays, then based on a principle that opposites attract, the charged particles are absorbed to positions of adjacent first sub-electrodes nearby, therefore, the aggregation position of the charged particles can be controlled by the first sub-electrodes to form a sight barrier of a side viewing angle, so as to realize an anti-peeping function, therefore, the anti-peeping device according to the embodiments of the disclosure has the advantages of simple process, low cost of raw materials, obvious anti-peeping effect, controllable viewing angle and effective protection of personal privacy.

It should be noted that, FIG. 1 to FIG. 3 only illustrate the scenario that a side of the upper substrate 1 facing the electrophoresis layer 3, and a side of the lower substrate 2 facing the electrophoresis layer 3 are both arranged with a corresponding electrode layer 4. Of course, the electrode layer can be only arranged on the side, facing the electrophoresis layer, of the upper substrate; or, the electrode layer can be only arranged on the side, facing the electrophoresis layer, of the lower substrate, and in both cases, the aggregation position of charged particles to absorb light rays can be controlled by the first sub-electrodes to form a sight barrier of a side viewing angle, so as to realize an anti-peeping function. The positional relationship among the electrode layer(s), the upper substrate and the lower substrate can be set according to practical situation, and will not be limited herein.

In the embodiments of the disclosure, the color of charged particles to absorb light rays can be set to a dark color, for example, black.

In a particular implementation, in the anti-peeping device according to the embodiments of the disclosure above, the electrophoresis layer can have a plurality of structures, and three implementations are enumerated as follows.

Particularly, in a first implementation, as illustrated in FIG. 1 and FIG. 3, the electrophoresis layer 3 includes: a transparent dispersion medium 32 and a plurality of colorant particles dispersed in the transparent dispersion medium 32, wherein the colorant particles can be black pigment particles or black dye particles, at this time, the black pigment particles or black dye particles are charged particles 31 to absorb light rays. Since the colorant particles have an electric property opposite to that of the first sub-electrodes 41, the colorant particles will be adsorbed to the positions of the first sub-electrodes 41 to form a sight barrier of a side viewing angle under the action of an electric field, so as to realize an anti-peeping function.

Particularly, in a second implementation, as illustrated in FIG. 2, in the anti-peeping device according to the embodiments of the disclosure above, the electrophoresis layer 3 can include: a transparent dispersion medium 32 and electronic ink facing the transparent dispersion medium 32.

In an anti-peeping device according to some embodiments of the disclosure, as illustrated in FIG. 2, the electronic ink is implemented by a plurality of microcapsules 30; each microcapsule 30 is internally encapsulated with black charged particles 301 and non-black charged particles 302, wherein the black charged particles have an electric property opposite to that of the non-black charged particles (these particles are encapsulated in a transparent organic solvent environment in the capsule). At this time, the black charged particles 301 are charged particles 31 to absorb light rays, since the black charged particles 301 have an electric property opposite to that of the first sub-electrodes 41, for example, the black charged particles are negatively charged while the first sub-electrodes are positively charged, then under the action of an electric field, the black charged particles 301 which are negatively charged will be adsorbed to the positions of the first sub-electrodes 41 to form a sight barrier of a side viewing angle, so as to realize an anti-peeping function.

Those skilled in the art can understand that, as to the electronic ink realized by microcapsules, microcapsules are coated on a conductive base substrate, such as an ITO base substrate, then under the action of an electric field, particles of different colors move, for example, black particles ascend to the top of microcapsules or descend to the bottom of microcapsules.

Generally, black charged particles used above are carbon black particles, while non-black charged particles are white titanium oxide particles.

In an anti-peeping device according to some embodiments of the disclosure, the electronic ink can also be implemented by a microcup array, a plurality of curable microcups are distributed on a conductive base substrate, such as an ITO base substrate; each microcup is encapsulated with black charged particles and non-black charged particles (these particles are encapsulated in a transparent organic solvent environment in the capsule), and an upper surface of each microcup is a transparent flexible substrate, while a lower surface is fit onto the conductive base substrate. Under the action of an electric field, charged particles move due to the electric property.

Generally, the black charged particles used in the above microcups are black dye particles, while the non-black charged particles used in the above microcups are white titanium oxide particles.

In an anti-peeping device according to some embodiments of the disclosure, the electrophoresis layer above can further be implemented by an electron current powder microcup, wherein the electron current powder microcup is internally encapsulated with black charged particles and non-black charged particles, wherein the black charged particles have an electric property opposite to that of the non-black charged particles (these particles are encapsulated in a gaseous environment in the microcup).

It should be noted that, although an electronic ink solution which can be used in the embodiments of the disclosure has already been disclosed, the electronic ink can be implemented in a plurality of ways, for example, the electronic ink can be implemented by distributed silicon dioxide light ink, as long as charged particles, which can form dark shielding under the action of an electric field, exist in the electronic ink.

In an anti-peeping device according to some embodiments of the disclosure, there are electrode layers arranged at a side of the upper substrate 1 facing the electrophoresis layer 3, and a side of the lower substrate 2 facing the electrophoresis layer 3. And for the arrangement mode of the first sub-electrodes, the following two implementations are available.

Particularly, in a first implementation, as illustrated in FIG. 1, an orthographic projection of first sub-electrodes 41 at one side of the upper substrate 1 onto the lower substrate 2 and an orthographic projection of first sub-electrodes 41 at one side of the lower substrate 2 onto the lower substrate 2 overlap with each other.

Particularly, in a second implementation, as illustrated in FIG. 3, an orthographic projection of the first sub-electrodes 41 at one side of the upper substrate 1 onto the lower substrate 2 and an orthographic projection of the first sub-electrodes 41 at one side of the lower substrate 2 onto the lower substrate 2 does not overlap with each other, and the first sub-electrodes at one side of the upper substrate are arranged in a staggered manner with the first sub-electrodes at one side of the lower substrate.

In the first implementation and the second implementation above, dark strips composed of multiple charged particles are just like shutters, and only the light of a specific angle can transmit from the position with no electrode, most light with oblique incidence is absorbed by charged particles at the positions with electrodes, then a display mode with a narrow viewing angle is obtained, namely, anti-peeping is realized. The arrangement mode of the first sub-electrodes above is not limited herein as long as it can satisfy the anti-peeping effect.

In an anti-peeping device according to some embodiments of the disclosure, the spacing between two adjacent first sub-electrodes in each electrode layer corresponds to a viewing angle of the anti-peeping device. In this way, the size of the spacing between two adjacent first sub-electrodes in each electrode layer is determined by the size of the viewing angle of the anti-peeping device, namely, the smaller the spacing between two adjacent first sub-electrodes in each electrode layer is, the smaller the viewing angle is, then a favorable narrow viewing angle effect can be obtained by controlling the spacing between two adjacent first sub-electrodes.

In the anti-peeping device according to some embodiments of the disclosure above, the spacing between the upper substrate and the lower substrate corresponds to the viewing angle of the anti-peeping device, in this way, the size of the spacing between the upper substrate and the lower substrate is determined by the size of the viewing angle of the anti-peeping device, namely, the greater the spacing between the upper substrate and the lower substrate is, the smaller the viewing angle is, then a favorable narrow viewing angle effect can be obtained by controlling the spacing between the upper substrate and the lower substrate.

Figure 4:
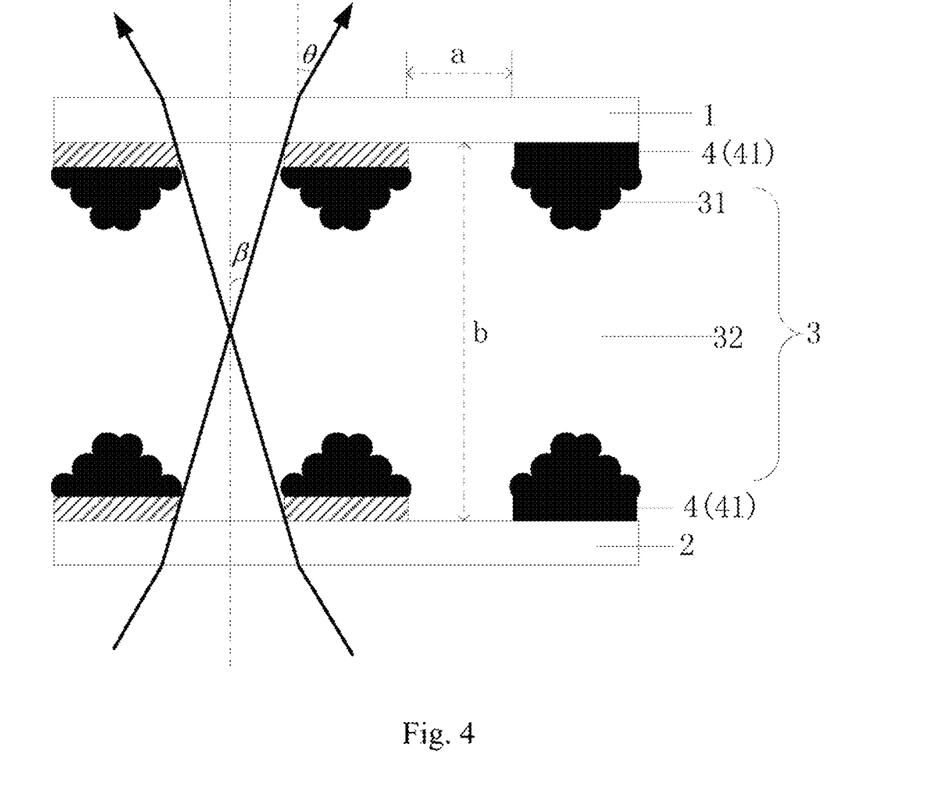
FIG. 4 is a schematic diagram of an anti-peeping angle corresponding to FIG. 1.

Taking FIG. 4 as an example for illustration, the spacing between two adjacent first sub-electrodes in each electrode layer is a, the spacing between the upper substrate and the lower substrate is b, the refractive index of the upper substrate is n, the emergence angle of light rays before transmitting through the upper substrate is β, and the emergence angle of light rays after transmitting through the upper substrate is θ, then sin θ=n×sin θ and tan β=a/b. It can thus be known that, when the spacing b is constant, the smaller the spacing a is, the smaller the viewing angle is, that is, the better the effect of a narrow viewing angle is; when the spacing a is constant, the greater the spacing b is, the smaller the viewing angle is, and the better the effect of a narrow viewing angle is. In order to give consideration to both a transmission rate of a front viewing angle and anti-peeping of a side viewing angle, different anti-peeping angles correspond to different design parameters by setting the relationship between a and b.

Figure 5:
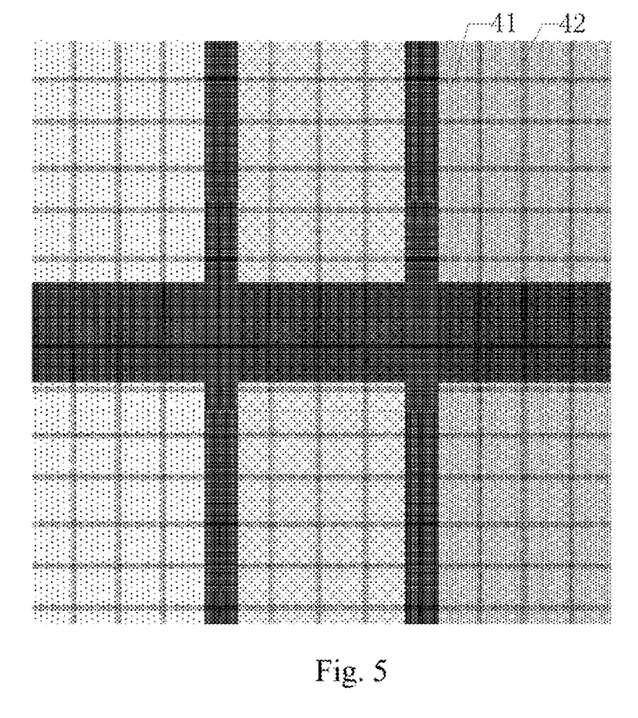
FIG. 5 is a top view of an anti-peeping device with second sub-electrodes according to the embodiments of the disclosure.

In an anti-peeping device according to some embodiments of the disclosure, in order to realize an anti-peeping function of four angles of upward, downward, leftward and rightward, as illustrated in FIG. 5, each electrode layer 4 further includes a plurality of second sub-electrodes 42 distributed along a second direction, and the second sub-electrodes 42 and the first sub-electrodes 41 are formed integrally, such that charged particles, just like transverse and longitudinal staggered shutters, can further realize an all-around anti-peeping function of a side viewing angle.

In the anti-peeping device according to some embodiments of the disclosure, the upper substrate and the lower substrate can be glass substrates or flexible substrates. When the upper substrate and the lower substrate are flexible substrates, they can be applicable to flexible display.

Embodiments of the disclosure further provide an anti-peeping method of the above anti-peeping device. Since the principle for solving problems of this method is similar to that of the above anti-peeping device, a reference can be made to the implementation of the anti-peeping device for an implementation of the method, so repeated description thereof will be omitted here.

Figure 6:
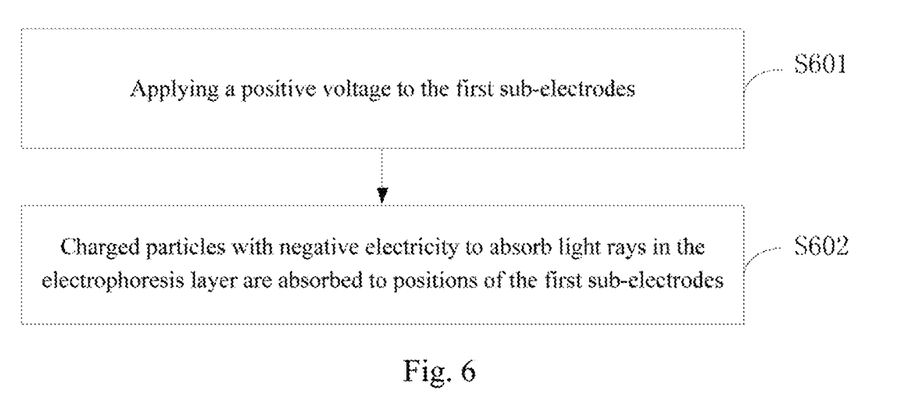
FIG. 6 is a first flow chart of an anti-peeping method of an anti-peeping device according to the embodiments of the disclosure.

As illustrated in FIG. 6, an anti-peeping method of an anti-peeping device with an electrophoresis layer according to some embodiments of the disclosure includes following operations.

S601, applying a positive voltage to the first sub-electrodes.

S602, charged particles with negative electricity to absorb light rays in the electrophoresis layer are absorbed to positions of the first sub-electrodes.

Figure 7:
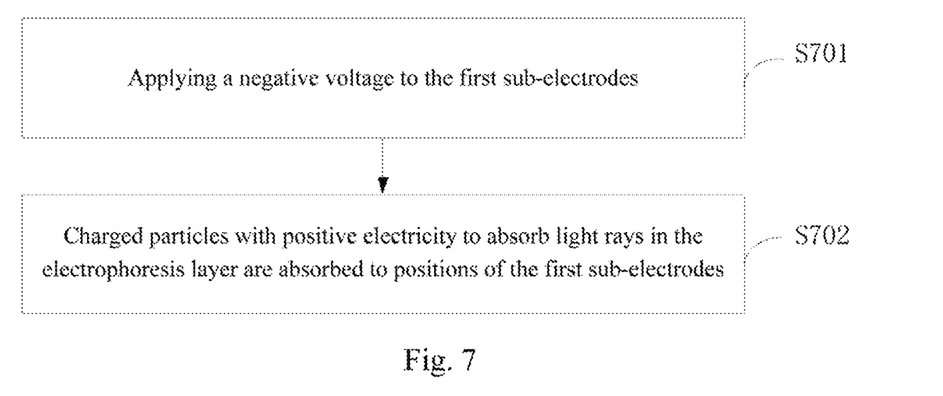
FIG. 7 is a second flow chart of an anti-peeping method of an anti-peeping device according to the embodiments of the disclosure.

In a particular implementation, as illustrated in FIG. 7, another anti-peeping method of an anti-peeping device with an electrophoresis layer according to some embodiments of the disclosure includes following operations.

S701, applying a negative voltage to the first sub-electrodes.

S702, charged particles with positive electricity to absorb light rays in the electrophoresis layer are absorbed to positions of the first sub-electrodes.

In some embodiments of the disclosure, an electro wetting layer is arranged between the upper substrate and the lower substrate which are arranged opposite to each other. Particularly, the anti-peeping device includes: an upper substrate and a lower substrate which are arranged opposite to each other, an electro wetting layer filled between the upper substrate and the lower substrate, and an electrode layer arranged on a side, facing the electro wetting layer, of at least one of the upper substrate and the lower substrate; wherein the electrode layer includes a plurality of first sub-electrodes distributed along a first direction; and the electro wetting layer includes liquid drops distributed at an interval on an insulation hydrophobic layer above the first sub-electrodes to absorb light rays. Therefore, the liquid drops in the electro wetting layer are dispersed to absorb light rays so as to control whether to transmit through the light rays or not.

In a particular implementation of the embodiments using the electro wetting layer above, the electrode layer further includes a plurality of second sub-electrodes distributed along a second direction, and the second sub-electrodes and the first sub-electrodes are formed integrally. That is, in the particular implementation, a microelectrode array is deployed on the electrode layer.

In a particular implementation of the embodiments using the electro wetting layer above, an insulation hydrophobic layer is generally fabricated by distributing a layer of hydrophobic material on an insulation dielectric layer; for example, a layer of Teflon, polyimide and the like is distributed on a silicon dioxide insulation layer. Respective groups of liquid drops are separated in a manner of being surrounded and cut by such a material as epoxy resin.

By arranging the electro wetting layer, the liquid drops include dark pigment (which is generally oil with a black color) and water, when a circuit is disconnected, an oil layer completely covers the bottom and the liquid drops presents as black. When the circuit is connected, water occupies most part of the bottom, and black oil drops are pushed to a corner and then light transmission is realized. The connection and disconnection of the microelectrode array are controlled via the electrode layer, so as to control whether to transmit through the light rays or not.

It should be noted that, the liquid drops are not limited to be of the types in the disclosure; and other types of liquid drops, such as water and other liquid with a different refractive index, can be used to control the transmission angle of light rays by making use of the difference in refractive index.

In a particular implementation of the embodiments using the electro wetting layer above, the upper substrate and the lower substrate are both provided with an electrode layer, and an orthographic projection of first sub-electrodes at one side of the upper substrate onto the lower substrate and an orthographic projection of first sub-electrodes at one side of the lower substrate onto the lower substrate overlap with each other.

In a particular implementation of the embodiments using the electro wetting layer above, the upper substrate and the lower substrate are both provided with an electrode layer, and an orthographic projection of the first sub-electrodes at one side of the upper substrate onto the lower substrate and an orthographic projection of the first sub-electrodes at one side of the lower substrate onto the lower substrate does not overlap with each other, and the first sub-electrodes at one side of the upper substrate are arranged in a staggered manner with the first sub-electrodes at one side of the lower substrate.

In a particular implementation of the embodiments using the electro wetting layer above, the spacing between two adjacent first sub-electrodes in each electrode layer corresponds to a viewing angle of the anti-peeping device.

In a particular implementation of the embodiments using the electro wetting layer above, the spacing between the upper substrate and the lower substrate corresponds to the viewing angle of the anti-peeping device.

In a particular implementation of the embodiments using an electro wetting layer above, the upper substrate and the lower substrate are glass substrates or flexible substrates.

Embodiments of the disclosure further provide an anti-peeping method of an anti-peeping device with an electro wetting layer, including: applying a voltage to an electrode layer, such that the liquid drops in the electro wetting layer are dispersed to absorb light rays. In this way, the liquid drops in the electro wetting layer are dispersed to absorb light rays so as to control whether to transmit through the light rays or not.

Embodiments of the disclosure further provide a display device, including a display panel and an anti-peeping device which are arranged in a stack manner; the anti-peeping device is the anti-peeping device according to the embodiments of the disclosure above, and the display device can be a mobile phone, a tablet computer, a television, a display, a notebook computer, a digital photo frame, a navigator and any other product or component with a display function. Other essential components of the display device should be understood as being arranged by those skilled in the art, will not be repeated herein, and should not be deemed as a limitation to the disclosure. As to the implementation of the display device, a reference can be made to the embodiments of the anti-peeping device above, so repeated description thereof will be omitted here.

Embodiments of the disclosure provide an anti-peeping device, an anti-peeping method thereof and a display device, wherein the anti-peeping device includes: an upper substrate and a lower substrate which are arranged opposite to each other, and an electrophoresis layer filled between the upper substrate and the lower substrate, wherein an electrode layer is arranged on a side, facing the electrophoresis layer, of at least one of the upper substrate and the lower substrate; the electrode layer includes a plurality of first sub-electrodes distributed along a first direction; and the electrophoresis layer includes charged particles with an electric property opposite to that of the first sub-electrodes to absorb light rays.

In the anti-peeping device according to the embodiments of the disclosure, when an electrophoresis layer is adopted, since the first sub-electrodes have an electric property opposite to that of the charged particles configured to absorb light rays, then based on a principle that opposites attract, the charged particles are nearby absorbed to the positions of adjacent first sub-electrodes, therefore, the first sub-electrodes can be used to control the aggregation position of the charged particles to form a sight barrier of a side viewing angle, so as to realize an anti-peeping function. Therefore, the anti-peeping device according to the embodiments of the disclosure has the advantages of simple process, low cost of raw materials, obvious anti-peeping effect, controllable viewing angle and effective protection of personal privacy.

Some embodiments of the disclosure further provide an anti-peeping device, an anti-peeping method thereof and a display device, wherein the anti-peeping device includes: an upper substrate and a lower substrate which are arranged opposite to each other, and an electro wetting layer filled between the upper substrate and the lower substrate; wherein an electrode layer is arranged on a side, facing the electrophoresis layer, of at least one of the upper substrate and the lower substrate; the electrode layer includes a plurality of first sub-electrodes distributed along a first direction; and the electro wetting layer includes liquid drops distributed at an interval on an insulation hydrophobic layer above the first sub-electrodes to absorb light rays.

In the anti-peeping device according to the embodiments of the disclosure, when an electro wetting layer is adopted, an electrode layer is used to control the diffusion of different liquid in the liquid drops, such that a light transmission state or a light proof state is formed, so as to form a sight barrier of a side viewing angle and further realize an anti-peeping function, therefore, the anti-peeping device according to the embodiments of the disclosure has the advantages of simple process, low cost of raw materials, obvious anti-peeping effect, controllable viewing angle and effective protection of personal privacy.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display device, comprising:
a display panel and an anti-peeping device which are arranged in a stack manner, wherein the anti-peeping device is disposed on a side of a light emitting surface of the display panel;
wherein the anti-peeping device comprises:
an upper substrate,
a lower substrate, and
an electrophoresis layer;
wherein the upper substrate and the lower substrate are arranged opposite to each other; the upper substrate and the lower substrate are both provided with an electrode layer, the electrode layer comprises a plurality of first sub-electrodes distributed along a first direction;
an orthographic projection of first sub-electrodes at one side of the upper substrate onto the lower substrate and an orthographic projection of first sub-electrodes at one side of the lower substrate onto the lower substrate does not overlap with each other, and the first sub-electrodes at one side of the upper substrate are arranged in a staggered manner with the first sub-electrodes at one side of the lower substrate;
the electrophoresis layer is disposed between the first sub-electrodes at one side of the upper substrate and the first sub-electrodes at one side of the lower substrate;
the electrophoresis layer comprises charged particles with an electric property opposite to that of the first sub-electrodes to absorb light rays; and
the first sub-electrodes at one side of the upper substrate and the first sub-electrodes at one side of the lower substrate are configured to drive the charged particles to move to form a sight barrier of a side viewing angle.

2. The display device according to claim 1, wherein the electrophoresis layer comprises: a transparent dispersion medium and a plurality of colorant particles dispersed in the transparent dispersion medium.

3. The display device according to claim 2, wherein the colorant particles are black pigment particles or black dye particles.

4. The display device according to claim 1, wherein the electrophoresis layer comprises: a transparent dispersion medium and electronic ink facing the transparent dispersion medium.

5. The display device according to claim 4, wherein the electronic ink comprises a plurality of microcapsules, wherein each of the plurality of microcapsules is internally encapsulated with black charged particles and non-black charged particles, wherein the black charged particles have an electric property opposite to that of the non-black charged particles.

6. The display device according to claim 4, wherein the electronic ink comprises a microcup array, wherein each microcup is internally encapsulated with black charged particles and non-black charged particles, wherein the black charged particles have an electric property opposite to that of the non-black charged particles.

7. The display device according to claim 1, wherein the electrophoresis layer comprises: a transparent dispersion medium and an electron current powder microcup facing the transparent dispersion medium, wherein the electron current powder microcup is internally encapsulated with black charged particles and non-black charged particles, wherein the black charged particles have an electric property opposite to that of the non-black charged particles.

8. A display device, comprising:
  a display panel and an anti-peeping device which are arranged in a stack manner, wherein the anti-peeping device is disposed on a side of a light emitting surface of the display panel;
  wherein the anti-peeping device comprises:
  an upper substrate,
  a lower substrate, and
  an electro wetting layer;
  wherein the upper substrate and the lower substrate are arranged opposite to each other; the upper substrate and the lower substrate are both provided with an electrode layer, the upper substrate and the lower substrate are both provided with an electrode layer, the electrode layer comprises a plurality of first sub-electrodes distributed along a first direction;
  an orthographic projection of first sub-electrodes at one side of the upper substrate onto the lower substrate and an orthographic projection of first sub-electrodes at one side of the lower substrate onto the lower substrate does not overlap with each other, and the first sub-electrodes at one side of the upper substrate are arranged in a staggered manner with the first sub-electrodes at one side of the lower substrate;
  the electro wetting layer is disposed between the first sub-electrodes at one side of the upper substrate and the first sub-electrodes at one side of the lower substrate;
  the electro wetting layer comprises liquid drops distributed at an interval on an insulation hydrophobic layer above the first sub-electrodes to absorb light rays; and
  the first sub-electrodes at one side of the upper substrate and the first sub-electrodes at one side of the lower substrate are configured to drive the liquid drops to move to form a sight barrier of a side viewing angle.

9. The display device according to claim 1, wherein spacing between two adjacent first sub-electrodes in each electrode layer corresponds to a viewing angle of the anti-peeping device.

10. The display device according to claim 1, wherein spacing between the upper substrate and the lower substrate corresponds to a viewing angle of the anti-peeping device.

11. The display device according to claim 1, wherein the electrode layer further comprises a plurality of second sub-electrodes distributed along a second direction, and the second sub-electrodes and the first sub-electrodes are formed integrally.

12. The display device according to claim 1, wherein the upper substrate and the lower substrate are glass substrates or flexible substrates.

13. An anti-peeping method of the display device according to claim 1, comprising:
  applying a positive voltage to the first sub-electrodes; and charged particles with negative electricity to absorb light rays in the electrophoresis layer are absorbed to positions of the first sub-electrodes.

14. An anti-peeping method of the display device according to claim 1, comprising:
  applying a negative voltage to the first sub-electrodes; and charged particles with positive electricity to absorb light rays in the electrophoresis layer are absorbed to positions of the first sub-electrodes.

15. An anti-peeping method of the display device according to claim 8, comprising:
  applying a voltage to the electrode layer, such that the liquid drops in the electro wetting layer are dispersed to absorb light rays.

* * * * *